April 20, 1937.    E. ALMDALE    2,077,454
AUTOMOBILE CHASSIS MEMBER AND METHOD OF MAKING SAME
Filed July 25, 1933    2 Sheets-Sheet 1
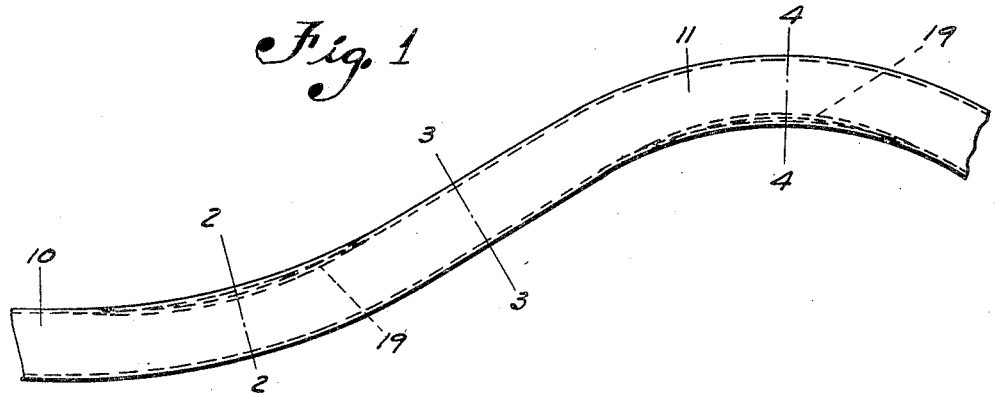
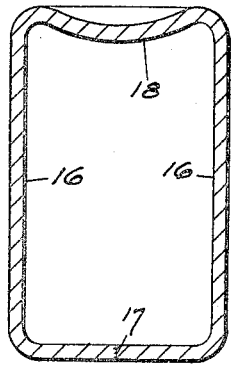
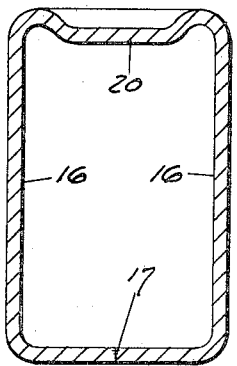
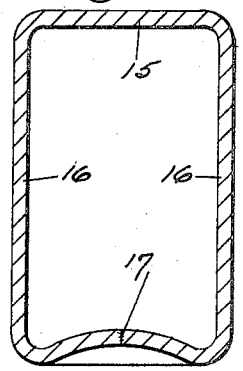
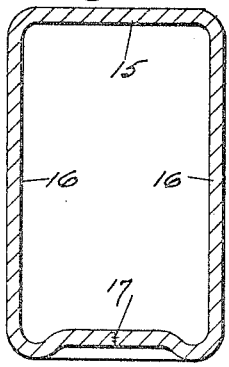
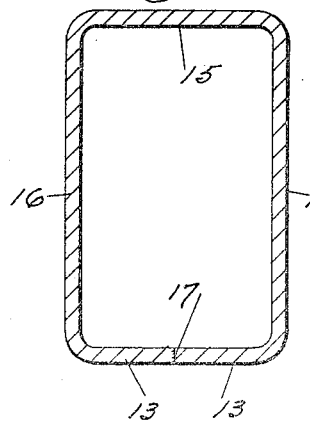
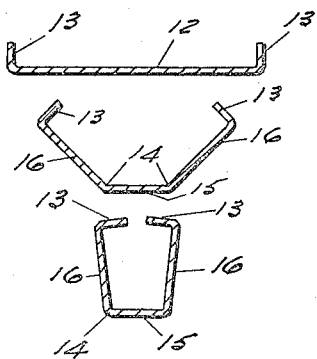
INVENTOR
EINAR ALMDALE
BY
Louis W. Helmuth
ATTORNEY April 20, 1937.  E. ALMDALE  2,077,454
AUTOMOBILE CHASSIS MEMBER AND METHOD OF MAKING SAME
Filed July 25, 1933  2 Sheets-Sheet 2
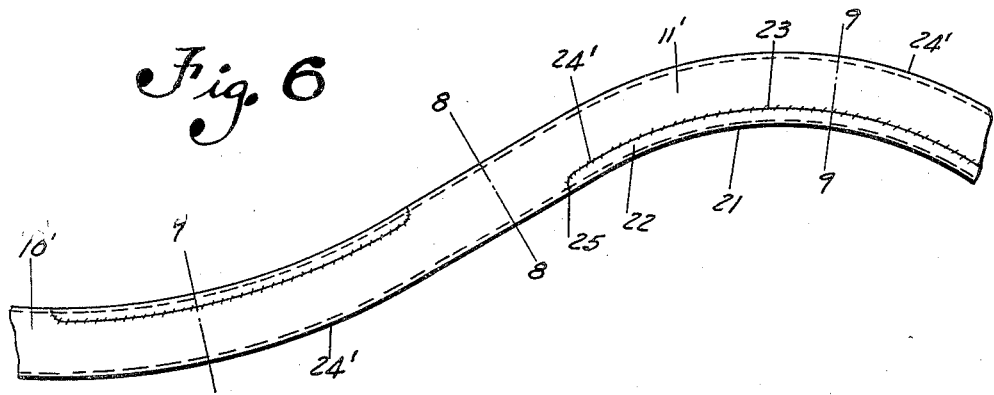
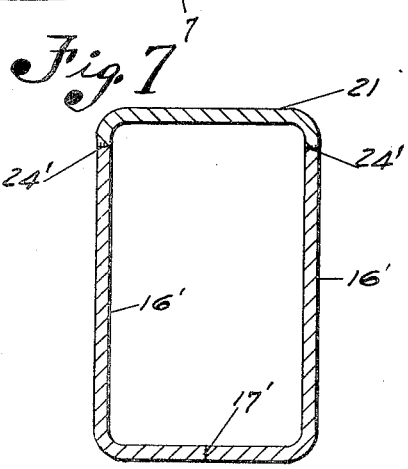
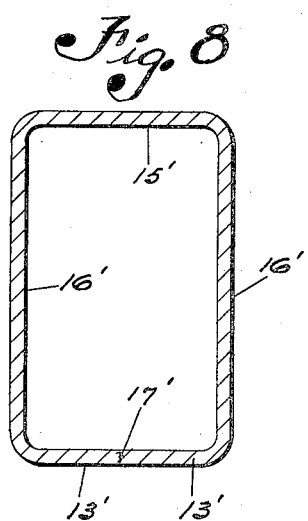
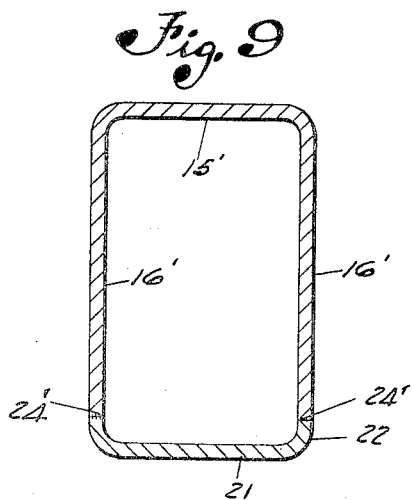
INVENTOR
EINAR ALMDALE
BY
*Louis W. Helmuth*
ATTORNEY Patented Apr. 20, 1937

2,077,454

UNITED STATES PATENT OFFICE 2,077,454

AUTOMOBILE CHASSIS MEMBER AND METHOD OF MAKING SAME

Einar Almdale, Detroit, Mich., assignor to The Midland Steel Products Company, Cleveland, Ohio, a corporation of Ohio Application July 25, 1933, Serial No. 682,077

14 Claims. (Cl. 29—152)

This invention relates to automotive chassis members and particularly a closed box cross-section type having offset or kick-up portions therein.

An important object of the invention is to provide ways and means of preventing or obviating the wrinkling and weakening of the stock in the concave wall of the offset or kick-up portion and at the same time provide additional strength in these portions to compensate for any possible thinning out of the stock in the convex region of the kick-up.

Another object of the invention is to provide automotive chassis members of very light gauge stock possessing sufficient resistance to torsion and stresses at the required points in the chassis.

Other objects and advantages of the invention will become apparent during the course of the following description.

The accompanying drawings forming a part of the descriptive matter wherein like numerals are employed to designate like parts throughout the several views, Fig. 1 is a side elevation of a kick-up or offset portion of an automotive side rail, Fig. 2 is a transverse section taken on the line 2—2 of Fig. 1, Fig. 2a is a similar section of a modification taken at the same point, Fig. 3 is a transverse section taken on the line 3—3 of Fig. 1, Fig. 4 is a transverse section taken on the line 4—4 of Fig. 1, Fig. 4a is a similar transverse section of a modified form taken at the same point, Fig. 5 illustrates the steps or passes through which the blank progresses from flat stock into final closed box-section form, Fig. 6 is a side elevation of a modified form of motor vehicle side rail at the kick-up portion thereof, Fig. 7 is a transverse section taken on the line 7—7 of Fig. 6, Fig. 8 is a transverse section taken on the line 8—8 of of Fig. 6, Fig. 9 is a transverse section taken along the line 9—9 of Fig. 6.

Referring now more specifically to the form of invention shown in Figs. 1 to 5 inclusive, the numeral 10 designates a portion of an automotive side rail or cross member having an offset or curved kick-up portion 11 where the side rail passes over a front or rear axle or where it is necessary for a cross member to clear some part of the vehicle or actuating mechanism therefor whereby the center of gravity of the vehicle can be made as low as possible. This member of the chassis is preferably formed of very light gauge stock such as $\frac{3}{32}''$ low carbon steel and may be of these specifications while still possessing requisite strength by reason of its formation and construction as hereinafter pointed out.

A flat strip blank 12 of this stock as shown in Fig. 5, suitably contoured and preferably having straight longitudinal edges throughout its length, it subjected to a series of forming passes as illustrated in Fig. 5, whereby the longitudinal margins 13 are first bent normal to the plane of the blank after which the latter is bent along longitudinal lines 14 to define a top or bottom wall 15 and side walls 16. After this pass the blank is subjected to further forming operations to move the side walls 16 further toward one another until they are substantially normal to the wall 15 whereby the longitudinal edges of the margins 13 can be joined or welded together to form an elongated member possessing completely closed box-shaped cross section. This joint is preferably made by butt-welding the edges 13 together to form an elongated hollow box-shaped section member. If desired, the joint or welded seam may be made to fall at a corner of the box section or in one of the side walls 16, and if desired the weld may be made autogenously in a continuous welding process whereby after the stock has been welded into box section form it may be cut up into requisite lengths to form side rails and cross members.

Having obtained a length of this closed box-section stock, it is subjected, in the portions to be offset, to dies engaging two or more walls but preferably all four walls of the box section to longitudinally curve a portion thereof out of its general plane and to form a top or bottom wall into convex form and the opposite wall into concave form with the side walls 16 following these contours to provide the box section member with an offset or kick-up portion 11 as shown in Fig. 1. This hollow member may be formed either hot or cold but due to the formation of the kick-up portion, the concave walls will be slightly wrinkled while the convex wall may be slightly stretched and thinned.

To compensate for this thinning action, remove the wrinkles in the concave walls and to reinforce these kick-up portions for torsional resistance and against bending stresses, the wall 15, preferably opposite the longitudinal welded seam 17 in the kick-up portion and forming the concave wall thereof is subjected to forming dies to remove the wrinkles incident to the off-setting operations and to preferably provide the concave wall with reinforcing ribs extending lengthwise of the member. As shown in Fig. 2, the top concave wall in the region illustrated is deflected inwardly of the closed box section as shown at 18 so that the maximum deflection occurs at the maximum bend of the member and gradually diminishes toward the ends of the curved portion of the member as illustrated by the dotted line 19 of Fig. 1. As illustrated in Fig. 2, the concave portion of the box section may be deflected inwardly of the box section and formed into a reinforcing rib 20 extending lengthwise of the member. Figs. 4 and 4a illustrate the bottom wall of the box section rail possessing the welded seam 17 and deflected inwardly of the box section in the manner as illustrated in Figs. 2 and 2a. By arranging for the welded seam to fall in the bottom wall of the rail, the top wall of the rail can be maintained smooth for the direct attachment of the vehicle body members and body to this top wall; suitable apertures being formed in the side walls 16 if necessary for the attachment of cross members to the side rails. Other forms of ribbing in the concave walls of the closed box section may be provided, but it will be obvious that beside obviating wrinkling of the stock, the kick-up portions are amply reinforced in a most effective manner. It has been found that the provision of reinforcing ribs whether disposed lengthwise or transversely of the member either in the side walls or top and bottom of the rail adds appreciably to the strength of the kick-up portions. The concave walls of the kick-ups may be shaped either during the offsetting operation or as a separate forming operation.

Referring now to Figs. 6 to 9 inclusive, another manner of accomplishing the foregoing objects is disclosed in which the cross section of the entire rail or cross member throughout its entire length is constant and as this form of member may be formed in the same manner as the form illustrated in Figs. 1 to 5 inclusive, parts of the form shown in Figs. 6 to 9 inclusive corresponding to parts in Figs. 1 to 5 inclusive are designated with the same numerals having a prime coefficient.

In order to obviate any wrinkling of the concave parts of the offset or kick-up portions 11, the concave walls 21 thereof and adjacent portions 22 of the side walls 16 are provided with openings 23 for the insertion of forming dies to engage the walls to be given convex shape. Suitable dies are provided for engaging the inside and outside surfaces of the convex walls 24, and if desired dies engaging the side walls 16' may be provided for properly confining the member during the operation and providing an offset or kick-up portions 11 in the box section member. After the kick-up has been formed, an arcuate channel-shaped section having its edges conforming to the shape of the opening 23 is secured to the edges of the opening 23 in any suitable manner but preferably by welding along the lines 24 thereby completely closing the box-shaped cross section in the region of the kick-up portion. This causes the welded seam 24 to be arranged lengthwise in each side wall 16 through the kick-up portion and also causes transverse welded seams 25 to be disposed transversely of the box section. The shape of the openings 23 may be varied to cause the welded seams 24 and 25 to be disposed in any manner found to add reinforcing characteristics to the box sections at the kick-up portions and if desired, the channel-shaped sections 21 may be of heavier gauge or stronger and different material than that composing the box section member.

Instead of pre-forming the member into closed box section throughout its entire length and removing portions thereof for the insertion of suitable dies to form the kick-up portion, a flat blank can be contoured or possess developed longitudinal edges so that when this blank is formed into box section it will provide the requisite openings in the portions to be concaved.

In either form of the device, the welding need not be along continuous lines, but may be provided only at spaced intervals along the joints to be made and the meeting edges where the weld is to be formed may be provided with complementary projections of any desired length adapted to be welded edge to edge, thereby providing the box section with openings at intervals rendering the interior of the box section accessible for the connection of cross members to the side rails.

It is to be understood that various changes in the shape, arrangement of parts as well as the sequence of steps in the method may be varied without departing from the scope of the appended claims.

I claim:

1. The method of forming closed box cross section chassis members consisting of forming a flat blank to box-shaped cross section, bending said hollow member transversely of its length and in the same plane therewith to form an offset portion therein curved transversely of the length of said member which induces transverse wrinkling of stock in the concave wall of the offset portion, and forming a rib in said concave wall longitudinally of the offset portion from the surplus metal gathered by the bending operation.

2. The method of forming closed box cross section chassis members consisting of forming a flat blank into box-shaped cross section with a portion thereof having substantially channel-shaped cross section, engaging said last named portion with dies to form it into curved kick-up portion, and then completely closing in said curved channel-shaped portion.

3. The method of forming a kick-up portion in a closed box section chassis member consisting of providing an opening in a wall opposite the wall to be given convex contour, engaging said last named wall with a die, and inserting a die through said opening to engage said wall to be convexed and subjecting the wall to bending pressure between the dies to form it and the side walls into a kick-up portion, and then bridging the edges of said opening with a member secured thereto.

4. The method of forming a kick-up portion in a closed box section chassis member consisting of providing an opening in a wall opposite the wall to be given convex contour, engaging said last named wall with a die, and inserting a die through said opening to engage said wall to be convexed and subjecting the wall to bending pressure between the dies to form it and the side walls into a kick-up portion, and then closing said opening to form the kick-up portion into completely closed box-shaped cross section.

5. The method of forming a closed box section chassis member with a curved kick-up portion, consisting of subjecting the member to pressure exerted parallel to the plane of the side walls to form the box section into a curved kick-up portion, and deflecting the concave wall of the kick-up inwardly of the box section to remove wrinkles and provide reinforcement therein.

6. A frame member for motor vehicles of substantially box-shaped cross section and having a curved portion offset from the general longitudinal line of the member, and a wall of said curved portion being formed with an integral pressed out rib to remove wrinkles and reinforce the section.

7. A frame member for motor vehicles of substantially box-shaped cross section and having a curved portion offset from the general longitudinal line of the member, and the concave wall of said curved portion being deflected to remove wrinkles from the curved portion of the member.

8. A frame member constructed from a single blank of light gauge metal formed into substantially closed box-shaped cross section and having a curved portion offset from the general longitudinal line of the member, and the concave wall of said curved portion being deflected to remove wrinkles therefrom.

9. A frame member of substantially closed box-shaped cross section having a curved kick-up portion with an opening therein, and a separate section filling said opening and welded to the edges thereof.

10. A frame member of substantially closed box-shaped cross section having a curved kick-up portion of substantially channel-shaped cross section, and a curved section welded thereto to form the kick-up portion into completely closed box-shape cross section.

11. The method of forming a kickup portion in a closed box section chassis member consisting of providing an opening in a wall opposite the wall to be given convex contour, engaging said last named wall with a die, and inserting a die through said opening to engage said wall to be convexed and subjecting the wall to bending pressure between the dies to form it and the side walls into a kickup portion, and then welding a channel shaped member to the edges of said opening to form the kickup portion into closed box section.

12. A frame member of substantially closed box-shaped cross section having a curved portion offset from the general longitudinal line thereof, the concaved part of the curved portion having a longitudinally extending opening therein, and means secured to and bridging the edges of the opening and forming said curved offset portion into box shaped cross section.

13. The method of forming an automobile frame member consisting of forming a flat blank with a portion thereof formed into channel section having a web and two flanges, bending said channel in a plane normal to the web connecting the flanges to form a kickup, and then fastening a piece of metal to the flanges of the channel to close the same and form said frame member into tubular section.

14. The method of forming an automobile frame member consisting of forming a flat blank with a portion thereof formed into channel section having a web and a pair of flanges, bending said channel in a plane normal to the web connecting the flanges and in a direction in which the edges of the flanges extend to stretch the metal of the web, and then fastening a piece of metal to the flanges of the channel to close the same and form said portions into closed box section.

EINAR ALMDALE.